United States Patent [19]
Berreman

[11] 4,190,330
[45] Feb. 26, 1980

[54] VARIABLE FOCUS LIQUID CRYSTAL LENS SYSTEM

[75] Inventor: Dwight W. Berreman, New Providence, N.J.

[73] Assignee: Bell Telephone Laboratories, Incorporated, Murray Hill, N.J.

[21] Appl. No.: 864,328

[22] Filed: Dec. 27, 1977

[51] Int. Cl.² ............................................. G02F 1/13
[52] U.S. Cl. ................................. 350/331; 350/335; 350/347
[58] Field of Search ................. 350/331, 335, 347

[56] References Cited
U.S. PATENT DOCUMENTS

| | | | |
|---|---|---|---|
| 3,876,287 | 4/1975 | Sprokel | 350/347 |
| 3,881,808 | 5/1975 | Gurtler et al. | 350/335 |
| 3,955,208 | 5/1976 | Wick et al. | 350/335 X |
| 4,037,929 | 7/1977 | Bricot et al. | 350/347 |
| 4,066,334 | 1/1978 | Fray et al. | 350/331 |
| 4,066,335 | 1/1978 | Courtney et al. | 350/331 X |

*Primary Examiner*—Edward S. Bauer
*Attorney, Agent, or Firm*—Peter V. D. Wilde; Peter A. Businger

[57] ABSTRACT

An optical lens system is disclosed which comprises a body of a nematic liquid crystal material placed in a variable electric or magnetic field. In response to variation of the field strength from zero to an upper limit, the focal length of the lens system changes continuously from a first focal length to a second focal length. The new lens system may be used, e.g., in cameras, telescopes, binoculars, projectors, and eyeglasses.

11 Claims, 3 Drawing Figures

VARIABLE FOCUS LIQUID CRYSTAL LENS SYSTEM

BACKGROUND OF THE INVENTION

1. Field of the Invention

The invention is concerned with optical focusing systems.

2. Description of the Prior Art

Optical focusing systems having variable focal length are widely used in optical imaging systems such as cameras, telescopes, binoculars, and projectors. Such systems typically comprise one or several glass or plastic lenses whose position is varied by a mechanical drive so as to effect a continuous change of focal length. Also, variation of focal length may be effected in lens systems in which the relative position of individual lenses is adjustable.

A variable focusing effect has also been achieved in a system in which light scattering particles are suspended in a fluid host medium and suitably arranged in such medium by means of an applied electric or magnetic field. Specifically, U.S. Pat. No. 3,531,185, "Liquid Lens Optical Guide Employing Neutral Particles Supported in the Liquid," S. J. Buchsbaum et al., discloses a light guide in which light undergoes repeated focusing as its travels in a fluid medium doped with light scattering particles, greater or lesser focal length being achieved depending on the strength of the applied field.

Systems based on doped fluids have also been proposed for purposes other than optical focusing. For example, U.S. Pat. No. 3,512,876, "Dipolar Electro-Optic Structures," A. M. Marks, discloses the use of a doped fluid system for electrically controlled optical filtering and shuttering. Yet another type of electro-optical device is disclosed in U.S. Pat. No. 3,374,358, "Light Display Device Employing Angularly Selective Polarizer," H. Majima. This latter device produces x-y displays similar to those obtainable by means of a cathode ray oscilloscope and is based on the rotation of the direction of polarization of polarized light in an optically active medium by an amount which depends on the strength of a voltage applied across the medium.

More recently, devices have been proposed which are based on electro-optical and magneto-optical effects in so-called liquid crystal materials, i.e., materials which are characterized in that they have at least one semi-ordered, mesomorphic phase in addition to a solid phase and an isotropic liquid phase. Well known mesomorphic phases are the smectic, nematic, and cholesteric phases, the nematic phase being of particular importance in the context of the present application. Molecules of nematic liquid crystal materials typically are rod-shaped or perhaps disk-shaped. In the former case the average direction of the long axes of molecules in a small region is designated the director of that region, in the latter case it is the direction, perpendicular to the disks which is used to define the director. The nematic phase of a nematic liquid crystal material is characterized in that directors of the material are aligned in a preferred direction.

R. A. Soref, "Electronically Scanned Analog Liquid Crystal Displays," Applied Optics Vol. 9, pages 1323–1329 (June 1970) discloses an optical display device comprising a thin layer of liquid crystal material sandwiched between optically transparent, electrically conducting electrodes. In response to an applied voltage, portions of the liquid crystal layer change from a transparent state to a light scattering state, thereby changing in visual appearance. A device having electrodes which may be opaque is disclosed in U.S. Pat. No. 3,674,342, "Liquid Crystal Display Device Including Side-by-Side Electrodes on a Common Substrate," J. A. Castellano et al, which appears to be particularly suitable for the display of line figures.

The use of liquid crystal materials has also been proposed for purposes other than optical display. For example, U.S. Pat. No. 3,741,629, "Electronically Variable Iris or Stop Mechanism," F. J. Kahn, discloses the use of a layer of liquid crystal material in combination with annular electrodes to serve as an electrically controlled iris.

SUMMARY OF THE INVENTION

It has been realized that a body of nematic liquid crystal material having a suitable shape and being placed in an electric or magnetic field whose strength can be varied, can serve as an optical lens whose focal length varies continuously in response to variation of field strength. The invention is a device comprising a body of liquid crystal material which acts as a variable focus lens. The device may be used, e.g., in cameras, telescopes, binoculars, projectors, and eyeglasses.

DETAILED DESCRIPTION

Figure 1:
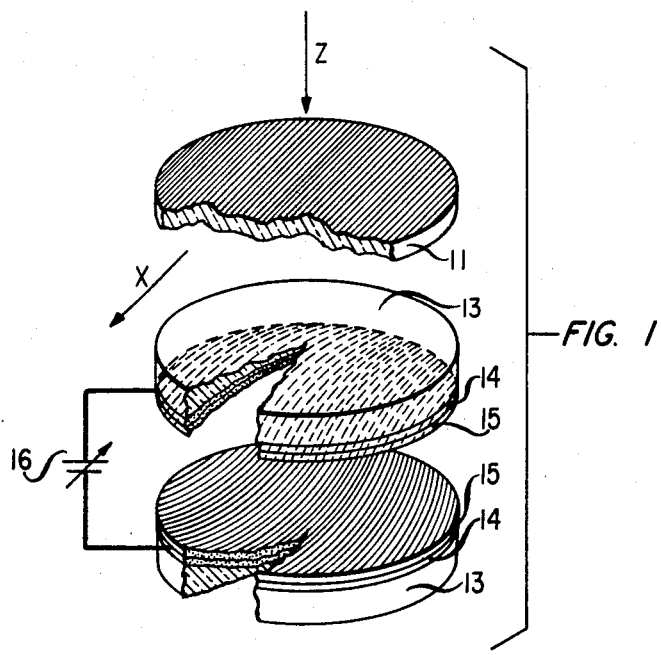
FIG. 1 is an exploded view of an embodiment of the invention comprising a polarizer.

FIG. 1 shows polarizer 11 and transparent substrate 13 having concave surfaces which face each other and which are coated with optically transparent, electrically conducting electrodes 14 which in turn, are coated with aligning layers 15. Polarizer 11 is oriented in direction x which is also the preferred direction imposed on the directors of liquid crystal material contained in the space between aligning layers 15. Electrodes 14 are connected to voltage generator 16 whereby an electrical field is produced between electrodes 14.

Figure 2:
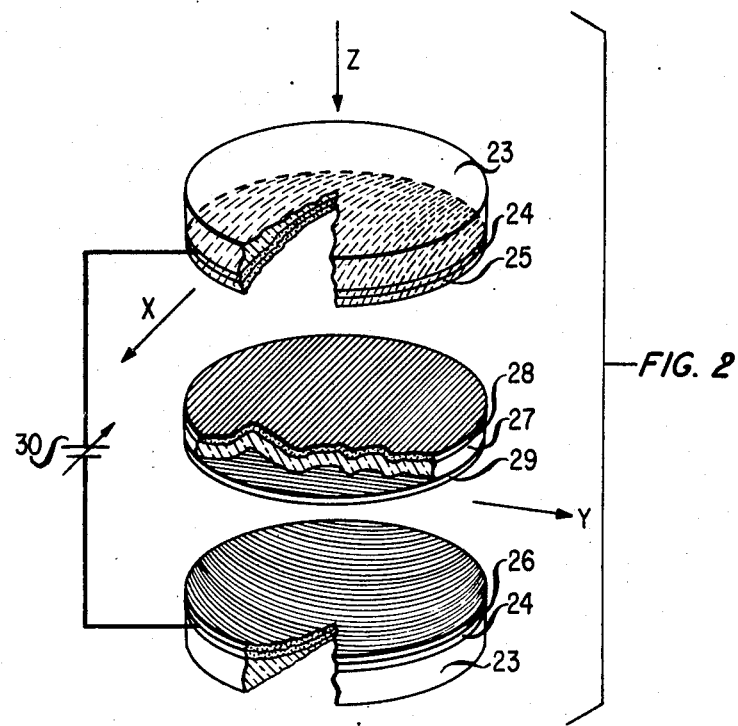
FIG. 2 is an exploded view of an alternate embodiment of the invention comprising a first and a second body of liquid crystal material.

FIG. 2 shows transparent substrates 23 having concave surfaces which face each other and which are coated with optically transparent, electrically conducting electrodes 24, which, in turn, are coated with aligning layers 25 and 26. Transparent plate 27 is positioned between transparent substrate 23 and coated with aligning layers 28 and 29. Layers 25 and 28 impose a preferred direction x on the directors of nematic liquid crystal material contained in the space between layers 25 and 28. Layers 26 and 29 impose a preferred direction y perpendicular to direction x on the directors of liquid crystal material contained in the space between layers 26 and 29. Electrodes 24 are connected to voltage generator 30 whereby an electrical field is produced between electrodes 24.

Figure 3:
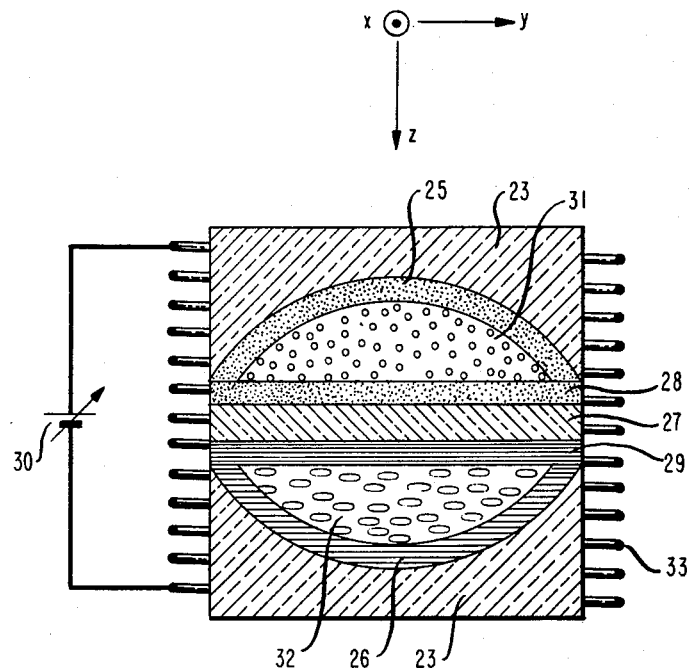
FIG. 3 is a schematic cross-sectional view of an alternate embodiment of the invention comprising an induction coil.

FIG. 3 shows bodies 31 and 32 of nematic liquid crystal material, and substrates 23, plate 27, aligning layers 25, 26, 28, and 29, and directions x, y, and z as in FIG. 2. Induction coil 33 is electrically connected to variable voltage generator 30 whereby a magnetic field is produced in direction z.

A key fact on which the invention is based is the phenomenon of birefringence in nematic liquid crystal materials analogous to birefringence in solid, uniaxial crystals such as calcite or fluorspar. This phenomenon is most readily described in terms of a splitting of a light ray entering the uniaxial birefringent crystal into two perpendicularly polarized rays called the ordinary ray and the extraordinary ray. While the refractive index of the crystal with respect to the ordinary ray is independent of the spatial relationship between ray and crystal, the same is not true for the extraordinary ray. Rather, the refractive index with respect to the extraordinary ray depends on the angle between the incident ray and the optic axis of the crystal. Consequently, by varying this angle such as by tilting the crystal while keeping the direction of incident light fixed, a variation of refractive index is produced with respect to the extraordinary ray in the crystal.

The phenomenon of birefringence also occurs in most nematic liquid crystal materials. In such materials a variation in refractive index with respect to the extraordinary ray is effected by varying the angle between the directors relative to the direction of incoming light. Such tilting of directors in a body of liquid crystal material can be produced by varying the strength of an electric or magnetic field across said body. In most liquid crystal materials directors tend to align themselves parallel to the direction of an electric or magnetic field; equally suitable, however, are materials in which the directors align themselves perpendicular to the direction of a field. In either case there is a threshold field strength below which directors do not appreciably respond to the applied field and above which they respond monotonically as the field strength increases until realignment in response to the field reaches saturation. In the case of an electric field, this threshold field strength is called the critical voltage for the Friedrichs transition. For a more detailed description of this mechanism see P. G. deGennes, "The Physics of Liquid Crystals," Clarendon Press, Oxford, 1974, pages 85–87.

The invention utilizes the phenomenon of a change of refractive index in response to a change of field strength to produce a variation of focal length in an optical focusing system comprising a body of nematic liquid crystal material. For example, in the device depicted in FIG. 1, polarizer 11 causes light propagating in direction z to become polarized in direction x, which, in the presence of aligning layers 15, coincides with the direction of polarization of the extraordinary ray of the nematic liquid crystal material oriented by layers 15. By increasing the strength of the electric field between electrodes 14, directors of the liquid crystal material are tilted towards direction z by amounts directly related to the field strength. As a consequence, the refractive index of the liquid crystal material changes with respect to the incoming polarized ray.

The device shown in FIG. 2 may be viewed as comprising two variable focus crystal lenses, each producing a variable focusing effect on perpendicularly polarized components of light incident in direction z. The ray which is the ordinary ray with respect to the body of liquid crystal material located between layers 25 and 28 is the extraordinary ray with respect to the body of liquid crystal material placed between layers 26 and 29 and conversely. In conjunction, these two bodies of liquid crystal material, in response to a variable electric field between electrodes 24, produce a variable focusing effect on light incident in direction z independent of the polarization of such incident light.

Aligning materials may be chosen to improve initial preferred directions parallel to the aligning layer as shown in the Figures. Alternate aligning materials may impose an initial preferred direction essentially perpendicular to the aligning layers. To vary focal length, in such latter case, electric or magnetic fields may be used to tilt directors towards a direction parallel to the aligning layer.

The body of liquid crystal material may be contained between surfaces which impart a bi-convex shape to said body as shown in the Figures. More generally, the body of liquid crystal material may have any desired shape and may even be simply a layer of uniform thickness. In such latter case, a field which is graded in strength from the center towards the edge of the layer may be used to achieve a focusing effect. Also the field in which the body of liquid crystal material is placed may be graded to enhance or cancel all or a portion of the focusing power of such body.

Selection of specific liquid crystal materials for the purpose of the invention may be based on a number of material properties such as temperature range in which the material is in a nematic phase, ease with which directors respond to a change in field strength, threshold field strength, and, in the case of an electric field, resistivity of the material. In an electric field, high-resistivity materials are particularly suited because in such materials detrimental light scattering turbidity caused by electric current flow occurs only at elevated voltages. In this respect, materials should preferably be chosen so as to prevent turbidity at field strengths up to a value at least three times that of the critical voltage for the Friedrichs transition. Alternatively, turbidity may be prevented by utilizing an AC electric field having sufficiently high frequency. In general, a frequency of at least 60 cycles per second effectively prevents turbidity in nematic liquid crystal materials. Too high a frequency should be avoided, however, since the field strength required to effect a desired change of focal length is directly related to frequency.

While not required to prevent turbidity in a nematic liquid crystal material, an alternating magnetic field may also be used for the purpose of the invention. Such a field can be conveniently produced by an induction coil placed around the circumference of the body of liquid crystal material.

In order to accelerate reversion of directors to the initial preferred direction, it may be advantageous to use auxiliary electric or magnetic fields in directions x and y. In the case of liquid crystal materials having frequency dependent reversible dielectric anisotropy, reversion of directors to initial preferred directions x and y may also be enhanced by an alternating field in direction z having a frequency higher than that used to cause tilting of directors towards direction z.

Nematic liquid crystal materials in common use e.g., in digital wrist watch and calculator displays such as the materials LC099E, LC03MM, and LC04MM manufactured by Atomergic Chemetals Corp., are well suited for the purpose of the invention.

EXAMPLE

The nematic liquid crystal material consisting of a mixture of 20 percent $C_4H_9C_6H_4CO_2C_6H_4CO_2C_6H_4C_4H_9$, 13 percent $C_4H_9C_6H_4CO_2C_6H$-

$_4CO_2C_6H_4OCH_3$, and 67 percent $C_6H_{13}OC_6H_4CO_2C_6H_4C_4H_9$, whose properties are described by C. J. Gerritsma, J. J. M. J. deKlerk, and P. van Zanten in "Changes of Twist in Twisted Nematic Liquid Crystal Layers by Frequency Switching of Applied Electric Fields," Solid State Communications, Vol. 17, No. 9, pages 1077–1080, was successfully used at room temperature in the arrangement depicted in FIG. 2. The effective aperture of the body of liquid crystal material contained between glass substrates was approximately seven mm. Layers of indium tin oxide having a thickness of approximately 4000 Angstrom were used as electrodes and layers of silicon monoxide as aligning layers having a thickness of approximately 400 Angstrom. Silicon monoxide was deposited by evaporating at a 45° angle to the substrates and at grazing angle to the flat plate. An AC voltage alternating at 60 cycles per second was applied to the electrodes. A change in focal length of two diopters was achieved by varying the voltage from zero to 75 volts. Upon reducing the applied voltage back to zero, the original focal length was realized.

I claim:

1. Optical device comprising a variable focus optical focusing system consisting essentially of a first body of an essentially uniformly transparent birefringent nematic liquid crystal material, a second body of an essentially uniformly transparent birefringent liquid crystal material, means for aligning the directors in said first body in a first direction, means for aligning the directors in said second body in a second direction which is essentially perpendicular to said first direction, a pair of electrodes or an induction coil for applying across said first body and said second body an electric or magnetic field having a component perpendicular to said first direction and said second direction, means for varying the strength of said electric or magnetic field, and means for providing light passing through said first body and said second body and having a component which is perpendicular to said first direction and said second direction.

2. Device of claim 1 in which said first body and said second body are contained between optically transparent substrates.

3. Device of claim 1 in which said means for aligning directors comprises at least a first aligning layer which is in contact with said first body and at least a second aligning layer which is in contact with said second body.

4. Device of claim 3 in which the material of said first aligning layer and said second aligning layer is silicon monoxide.

5. Device of claim 1 in which said field is a DC electric field and in which said liquid crystal material is a high-resistivity material.

6. Device of claim 5 in which the strength of said field is less than three times the critical voltage of the Friedrichs transistion of said first body and said second body.

7. Device of claim 1 in which said field is an AC electric field.

8. Device of claim 7 in which the frequency of said field is at least 60 cycles per second.

9. Device of claim 1 in which the material of said electrodes is indium tin oxide.

10. Device of claim 7 comprising means for varying the frequency of said alternating electric field.

11. Device of claim 1 in which said optical focusing system is a camera lens, a telescopic lens, a projector lens, or an eyeglass lens.

* * * * *